(12) United States Patent
Bolyard

(10) Patent No.: US 10,868,882 B1
(45) Date of Patent: Dec. 15, 2020

(54) METHODS AND SYSTEMS FOR FACILITATING REDIRECTING OF INTERNET TRAFFIC TO SERVICE PROVIDERS OF A PARTICULAR LOCATION

(71) Applicant: David Bolyard, Clarksburg, WV (US)

(72) Inventor: David Bolyard, Clarksburg, WV (US)

( * ) Notice: Subject to any disclaimer, the term of this patent is extended or adjusted under 35 U.S.C. 154(b) by 0 days.

(21) Appl. No.: 16/912,005

(22) Filed: Jun. 25, 2020

Related U.S. Application Data

(60) Provisional application No. 63/011,148, filed on Apr. 16, 2020.

(51) Int. Cl.
| | |
|---|---|
| *G06F 16/9537* | (2019.01) |
| *H04L 29/08* | (2006.01) |
| *G06F 16/953* | (2019.01) |
| *G06F 16/95* | (2019.01) |

(52) U.S. Cl.
CPC .......... *H04L 67/2814* (2013.01); *G06F 16/95* (2019.01); *G06F 16/953* (2019.01); *G06F 16/9537* (2019.01); *H04L 67/16* (2013.01); *H04L 67/18* (2013.01); *H04L 67/306* (2013.01)

(58) Field of Classification Search
CPC . H04L 67/16; H04L 67/2814; H04L 67/2833; G06F 16/95; G06F 16/953; G06F 16/9537; G06Q 30/0261; G06Q 30/0252
See application file for complete search history.

(56) References Cited

U.S. PATENT DOCUMENTS

| | | | |
|---|---|---|---|
| 8,560,516 B2 | 10/2013 | Chiu | |
| 8,880,516 B2 | 11/2014 | Korte et al. | |
| 10,366,434 B1 | 7/2019 | Belousova et al. | |
| 2007/0088794 A1* | 4/2007 | Akins | H04L 67/2809 709/217 |
| 2009/0092247 A1* | 4/2009 | Kido | H04L 63/062 380/30 |
| 2013/0085881 A1* | 4/2013 | Chary | G06Q 30/02 705/26.1 |
| 2013/0246397 A1* | 9/2013 | Farver | G06Q 30/0261 707/722 |
| 2015/0371265 A1* | 12/2015 | Leisher | G06Q 30/0261 705/14.55 |
| 2017/0098256 A1* | 4/2017 | Long | G06F 16/9537 |
| 2020/0143497 A1* | 5/2020 | Greenhalgh | G06Q 30/0619 |

* cited by examiner

*Primary Examiner* — Jeong S Park

(57) ABSTRACT

Disclosed herein is a method for facilitating redirecting of internet traffic to service providers of a particular location. The method includes receiving, using a communication device, at least one request from at least one user device associated with at least one user.
Further, the method includes analyzing, using a processing device, the at least one request. Further, the method includes determining, using the processing device, at least one location based on the analyzing. Further, the method includes identifying, using the processing device, at least one service provider based on the determining. Further, the method includes generating, using the processing device, a service provider list. Further, the method includes transmitting, using the communication device, the service provider list to the at least one user device.

18 Claims, 14 Drawing Sheets

METHODS AND SYSTEMS FOR FACILITATING REDIRECTING OF INTERNET TRAFFIC TO SERVICE PROVIDERS OF A PARTICULAR LOCATION

The current application claims a priority to the U.S. Provisional Patent application Ser. No. 63/011,148 filed on Apr. 16, 2020.

TECHNICAL FIELD

Generally, the present disclosure relates to the field of data processing. More specifically, the present disclosure relates to methods and systems for facilitating redirecting of internet traffic to service providers of a particular location.

BACKGROUND

Local businesses face challenges with receiving online traffic towards their websites and other online platforms. The big internet companies control most of the internet traffic and they control the traffic based on costly advertisements.

Existing techniques for redirecting internet traffic to valid local businesses are deficient with regard to several aspects. For instance, current technologies do not provide a platform for local businesses to engage with the audience based on location.

Therefore, there is a need for improved methods and systems for facilitating redirecting of internet traffic to service providers of a particular location that may overcome one or more of the above-mentioned problems and/or limitations.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method for facilitating redirecting of internet traffic to service providers of a particular location. The method may include receiving, using a communication device, at least one request from at least one user device associated with at least one user.

Further, the method may include analyzing, using a processing device, the at least one request. Further, the method may include determining, using the processing device, at least one location based on the analyzing. Further, the method may include identifying, using the processing device, at least one service provider based on the determining. Further, the at least one service provider may be associated with at least one service. Further, the at least one service may include at least one information associated with at least one event. Further, the at least one event may include at least one of a life event, a birth event, a death event, a wedding event, a ceremonial event, and a graduation event. Further, the method may include generating, using the processing device, a service provider list. Further, the method may include transmitting, using the communication device, the service provider list to the at least one user device.

According to some embodiments, a system for facilitating redirecting of internet traffic to service providers of a particular location is disclosed. The system may include a communication device configured for receiving at least one request from at least one user device associated with at least one user and transmitting a service provider list to the at least one user device. Further, the system may include a processing device configured for analyzing the at least one request, determining at least one location based on the analyzing, and identifying at least one service provider based on the determining. Further, the at least one service provider may be associated with at least one service. Further, the at least one service may include at least one information associated with at least one event. Further, the at least one event may include at least one of a life event, a birth event, a death event, a wedding event, a ceremonial event, and a graduation event. Further, the processing device may be configured for generating the service provider list.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

Figure 1:
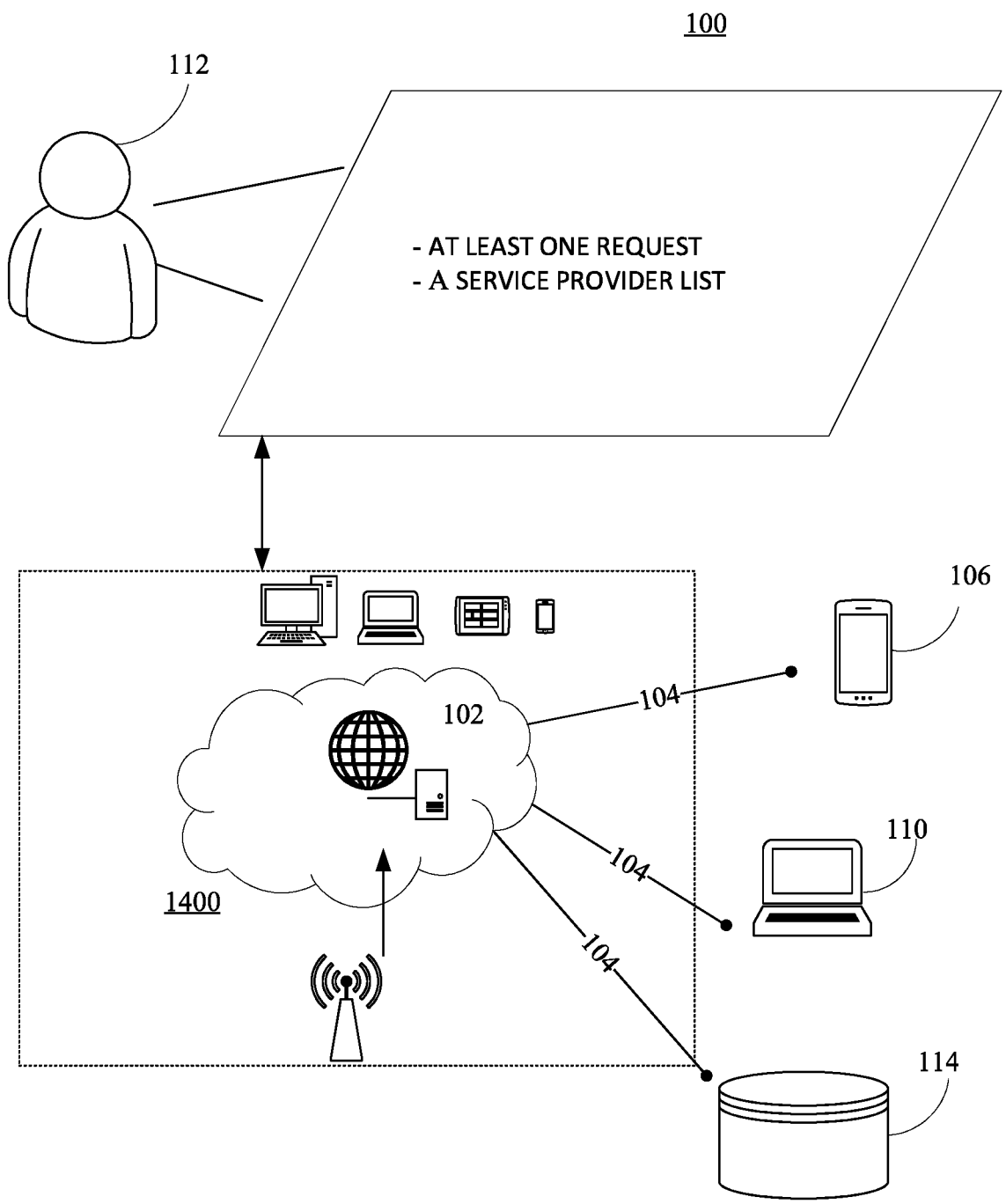
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods and systems for facilitating redirecting of internet traffic to service providers of a particular location, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled and/or terminated based on a control input received from one or more devices operated by one or more users such as, for example, but not limited to, an end-user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g. username, password, passphrase, PIN, secret question, secret answer, etc.) and/or possession of a machine-readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, a GLONASS-K2 receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes systems and methods for redirecting internet traffic to valid businesses of a particular area. Further, the present disclosure may be a portal/website/web page for a city or state and a county across the United States. Further, the present disclosure may provide a platform for local areas businesses or national level businesses.

For Example, if a user searches "Harrison County, WV" on the portal, the portal may bring the user to a local TV stations website, a newspaper website or just a local page within which, the user may select TV news, newspaper news, weather, sports, local government, life events, birth, death, wedding, graduation, and many more.

According to some embodiments, a method for redirecting internet traffic to valid businesses of a particular area is disclosed. Accordingly, the method may include a step of receiving, using a communication device, a request from at least one user device associated with at least one user. Further, the method may include a step of analyzing, using a processing device, the request to obtain at least one of a location of interest and a requested service. Further, the method may include a step of determining, using the processing device, a plurality of service providers associated with the location and the requested service. Further, the method may include a step of generating, using the processing device, a service provider list associated with the plurality of service providers. Further, the method may include a step of transmitting, using the communication device, the service provider list to the at least one user device.

Referring now to figures, FIG. 1 is an illustration of an online platform 100 consistent with various embodiments of the present disclosure. By way of non-limiting example, the online platform 100 to facilitate redirecting of internet traffic to service providers of a particular location may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), and databases 114 over a communication network 104, such as, but not limited to, the Internet. Further, users of the online platform 100 may include relevant parties such as, but not limited to, end-users, users, service providers, administrators, and so on. Accordingly, in some instances, electronic devices operated by the one or more relevant parties may be in communication with the platform 100.

A user 112, such as the one or more relevant parties, may access online platform 100 through a web-based software application or browser. The web-based software application may be embodied as, for example, but not be limited to, a website, a web application, a desktop application, and a mobile application compatible with a computing device 1400.

Figure 2:
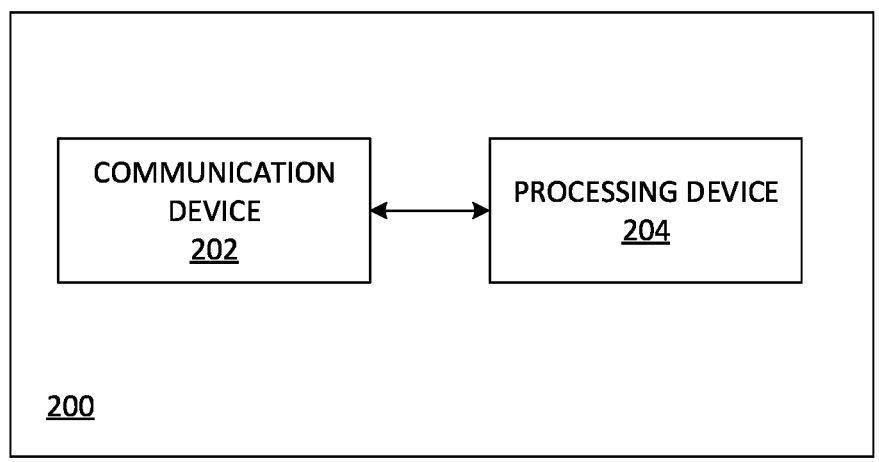
FIG. 2 is a block diagram of a system for facilitating redirecting of internet traffic to service providers of a particular location, in accordance with some embodiments.

FIG. 2 is a block diagram of a system 200 for facilitating redirecting of internet traffic to service providers of a particular location, in accordance with some embodiments. Accordingly, the system 200 may include a communication device 202 and a processing device 204.

Further, the communication device 202 may be configured for receiving at least one request from at least one user device (such as the mobile device 106, the electronic devices 110, etc.) associated with at least one user. In some embodiments, the at least one user device may include at least one sensor. Further, the at least one sensor may be configured for generating the at least one request based on a location of the at least one user device. Further, the at least one request may include an indication of at least one of a location of interest and a service of interest.

Further, the communication device 202 may be configured for transmitting a service provider list to the at least one user device.

Further, the processing device 204 may be configured for analyzing the at least one request.

Further, the processing device 204 may be configured for determining at least one location based on the analyzing. Further, the at least one location may relate to at least one geographical area. Further, the at least one geographical area may include at least one city, at least one county, at least one state, at least one country, etc.

Further, the processing device 204 may be configured for identifying at least one service provider based on the determining. Further, the at least one service provider may be associated with at least one service. Further, the at least one service may include at least one information associated with at least one event. Further, the at least one event may include at least one of a life event, a birth event, a death event, a wedding event, a ceremonial event, and a graduation event. Further, the at least one service may include a website service (such as a local TV station website, a newspaper website, a local page website, etc.), a TV news service, a newspaper news service, a weather forecasting service, a sports service, a local government service, etc. Further, the at least one service may provide the at least one information associated with the at least one event.

Further, the processing device 204 may be configured for generating the service provider list. Further, the service provider list may include a list of the at least one service provider associated with the at least one location.

According to further embodiments, the processing device 204 may be further configured for determining at least one requested service based on the analyzing of the at least one request. Further, the at least one requested service may include the at least one service. Further, the processing device 204 may be configured for selecting at least one first service provider of the at least one service provider based on the determining of the at least one requested service. Further, the generating of the service provider list may be based on the selecting.

Figure 3:
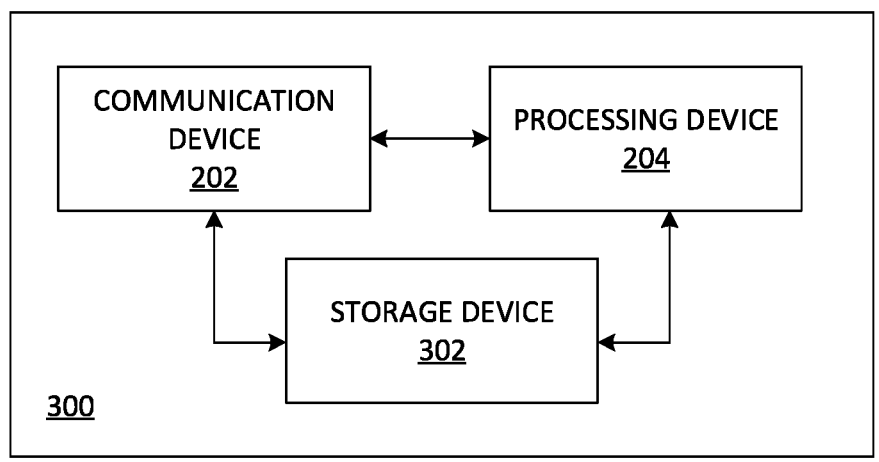
FIG. 3 is a block diagram of a system for facilitating redirecting of internet traffic to service providers of a particular location, in accordance with some embodiments.

FIG. 3 is a block diagram of a system 300 for facilitating redirecting of internet traffic to service providers of a particular location, in accordance with further embodiments.

Accordingly, the system 300 may include a communication device 202, a processing device 204, and a storage device 302.

In further embodiments, the communication device 202 may be further configured for receiving a plurality of first requests associated with a plurality of service providers from a plurality of service provider devices (such as the mobile device 106, the electronic devices 110, etc.). Further, the plurality of first requests may include an indication of a location of the plurality of service providers. Further, the processing device 204 may be configured for analyzing the plurality of first requests, determining a plurality of first locations corresponding to the plurality of service providers based on the analyzing of the plurality of first requests and generating a primary service provider list. Further, the storage device 302 may be configured for storing the primary service provider list. Further, the plurality of first locations relates to at least one geographical area. Further, the at least one geographical area may include at least one city, at least one county, at least one state, at least one country, etc. Further, the primary service provider list may include a list of the plurality of service providers. Further, the plurality of service providers may be associated with at least one service. Further, the at least one service may include at least one information associated with at least one event. Further, the at least one event may include at least one of a life event, a birth event, a death event, a wedding event, a ceremonial event, and a graduation event. Further, the at least one service may include a website service (such as a local TV station website, a newspaper website, a local page website, etc.), a TV news service, a newspaper news service, a weather forecasting service, a sports service, a local government service, etc. Further, the at least one service may provide the at least one information associated with the at least one event.

In further embodiments, the processing device 204 may be further configured for generating a plurality of data associated with the plurality of service providers based on the analyzing of the plurality of first requests. Further, the plurality of data may include a location of the plurality of service providers. Further, the processing device 204 may be configured for analyzing the plurality of data based on at least one first data. Further, the at least one first data may include an information of the plurality of service providers associated with the at least one location. Further, the processing device 204 may be configured for identifying a plurality of first service providers of the plurality of service providers based on the analyzing of the plurality of data. Further, the generating of the primary service provider list may be based on the identifying of the plurality of first service providers of the plurality of service providers. Further, the communication device may be configured for receiving the at least one first data from at least one external device (such as the mobile device 106, the electronic devices 110, etc.). Further, the at least one external device may be associated with at least one external user (such as the user 112).

In further embodiments, the identifying of the at least one service provider is from the primary service provider list based on the determining of the at least location.

In further embodiments, the processing device 204 may be further configured for determining a proximity corresponding to each first location of the plurality of first locations in relation to the at least one location. Further, the identifying of the at least one service provider may be based on the determining of the proximity corresponding to the each first location of the plurality of first locations in relation to the at least one location.

In some embodiments, the communication device 202 may be further configured for receiving at least one service provider indication from the at least one user device and transmitting the at least one information to the at least one user device. Further, the processing device 204 may be configured for identifying the at least one service provider based on the at least one service provider indication, Further, the storage device 302 may be configured for retrieving the at least one information corresponding to the at least one service associated with the at least one service provider based on the identifying of the at least one service provider based on the at least one service provider indication.

In some embodiments, the communication device 202 may be further configured for receiving the at least one information associated with the at least one service from at least one service provider device and receiving at least one first information from at least one external device (such as the mobile device 106, the electronic devices 110, etc.). Further, the at least one first information may include an information of the at least one information associated with the at least one location. Further, the processing device 204 may be configured for analyzing the at least one information based on the at least one first information and determining an authenticity of the at least one information. Further, the storage device 302 may be configured for storing the at least one information corresponding to the at least one service associated with the at least one service provider based on the determining of the authenticity.

In some embodiments, the communication device 202 may be further configured for receiving the at least one information associated with the at least one service from at least one service provider device. Further, the processing device 204 may be configured for analyzing the at least one information, determining at least one second location associated with the at least one event based on the analyzing of the at least one information, determining a first proximity of each second location of the at least one second location in relation to the at least one location and identifying the at least one second information of the at least one information based on the determining of the first proximity. Further, the storage device 302 may be configured for storing the at least one second information corresponding to the at least one service associated with the at least one service provider based on the identifying of the at least one second information of the at least one information. Further, the at least one second location may include an information of the at least one event associated with the at least one location.

In some embodiments, the processing device 204 may be further configured for determining at least one temporal characteristic associated with the at least one request based on the analyzing of the at least one request, analyzing the at least one information, determining at least one first temporal characteristic of the at least one event based on the analyzing of the at least one information, determining at least one relationship between the at least one first temporal characteristic and the at least one temporal characteristic and identifying at least one third information of the at least one information based on the determining of the at least one relationship. Further, the communication device 202 may be configured for receiving the at least one information associated with the at least one service from at least one service provider device (such as the mobile device 106, the electronic devices 110, etc.). Further, the storage device 302 may be configured for storing the at least one third information corresponding to the at least one service associated with the at least one service provider based on the identifying of the at least one third information of the at least one information. Further, the at least one temporal characteristic may include at least one of a time event and a date event of the at least one request. Further, the at least one first temporal characteristic may include at least one of a time event and a date event of the at least one event. Further, the at least one relationship may include a proximity associated with the at least one temporal characteristic and the at least one first temporal characteristic.

Figure 4:
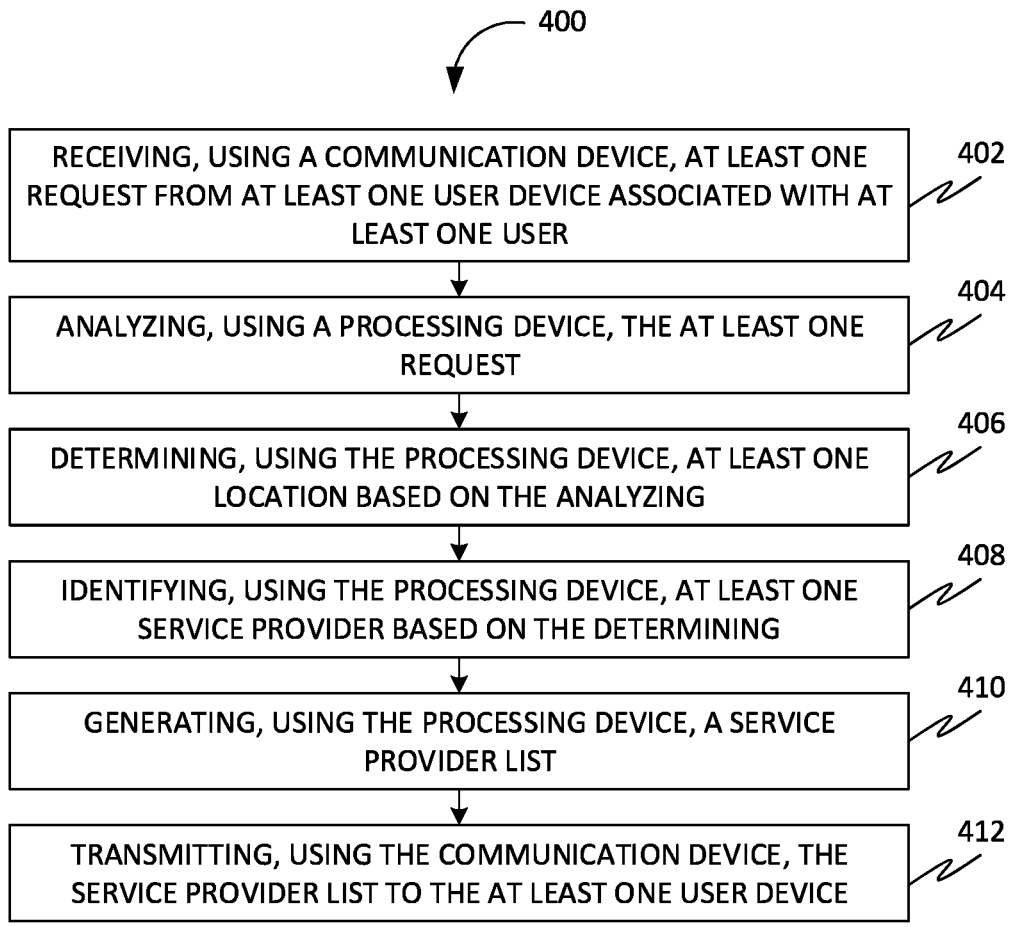
FIG. 4 is a flowchart of a method for facilitating redirecting of internet traffic to service providers of a particular location, in accordance with some embodiments.

FIG. 4 is a flowchart of a method 400 for facilitating redirecting of internet traffic to service providers of a particular location, in accordance with some embodiments. At 402, the method 400 may include receiving, using a communication device (such as the communication device 202), at least one request from at least one user device (such as the mobile device 106, the electronic devices 110, etc.) associated with at least one user (such as the user 112). In some embodiments, the at least one user device may include at least one sensor, wherein the at least one sensor is configured for generating the at least one request based on a location of the at least one user device. Further, the at least one request may include an indication of at least one of a location of interest and a service of interest.

Further, at 404, the method 400 may include analyzing, using a processing device (such as the processing device 204), the at least one request.

Further, at 406, the method 400 may include determining, using the processing device, at least one location based on the analyzing. Further, the at least one location may relate to at least one geographical area. Further, the at least one geographical area may include at least one city, at least one county, at least one state, at least one country, etc.

Further, at 408, the method 400 may include identifying, using the processing device, at least one service provider based on the determining. Further, the at least one service provider may be associated with at least one service. Further, the at least one service may include at least one information associated with at least one event. Further, the at least one event may include at least one of a life event, a birth event, a death event, a wedding event, a ceremonial event, and a graduation event. Further, the at least one service may include a website service (such as a local TV station website, a newspaper website, a local page website, etc.), a TV news service, a newspaper news service, a weather forecasting service, a sports service, a local government service, etc. Further, the at least one service may provide the at least one information associated with the at least one event.

Further, at 410, the method 400 may include generating, using the processing device, a service provider list. Further, the service provider list may include a list of the at least one service provider associated with the at least one location.

Further, at 412, the method 400 may include transmitting, using the communication device, the service provider list to the at least one user device.

Figure 5:
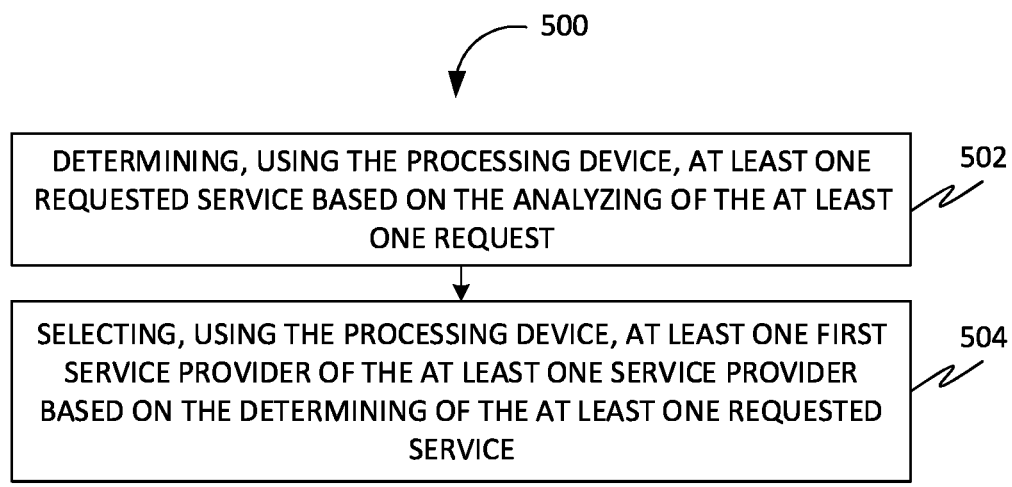
FIG. 5 is a flowchart of a method for identifying at least one first service provider of the at least one service provider, in accordance with further embodiments.

FIG. 5 is a flowchart of a method 500 for identifying at least one first service provider of the at least one service provider, in accordance with further embodiments. At 502, the method 500 may include determining, using the processing device, at least one requested service based on the analyzing of the at least one request. Further, the at least one requested service may include the at least one service.

Further, at 504, the method 500 may include selecting, using the processing device, the at least one first service provider of the at least one service provider based on the determining of the at least one requested service, wherein the generating of the service provider list is based on the selecting.

Figure 6:
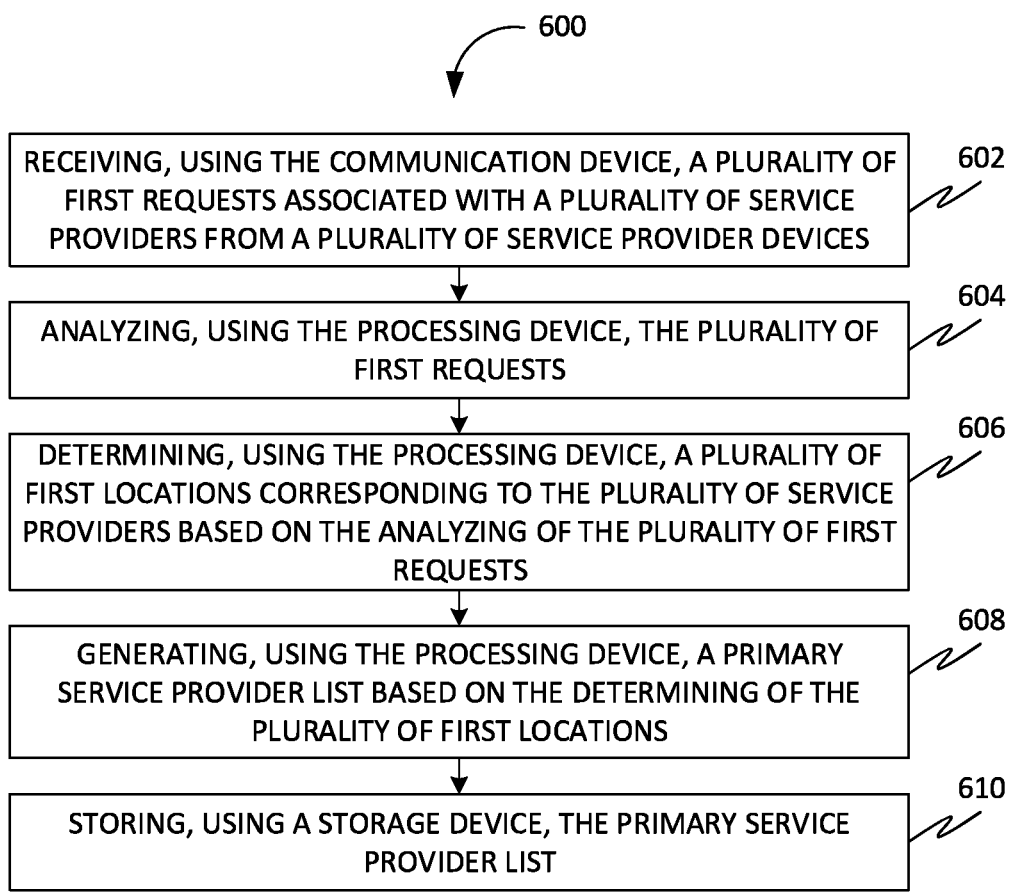
FIG. 6 is a flowchart of a method for creating a primary service provider list, in accordance with further embodiments.

FIG. 6 is a flowchart of a method 600 for creating a primary service provider list, in accordance with further embodiments. At 602, the method 600 may include receiving, using the communication device, a plurality of first requests associated with a plurality of service providers from a plurality of service provider devices (such as the mobile device 106, the electronic devices 110, etc.). Further, the plurality of first requests may include an indication of a location of the plurality of service providers. Further, the plurality of service providers may be associated with at least one service. Further, the at least one service may include at least one information associated with at least one event. Further, the at least one event may include at least one of a life event, a birth event, a death event, a wedding event, a ceremonial event, and a graduation event. Further, the at least one service may include a website service (such as a local TV station website, a newspaper website, a local page website, etc.), a TV news service, a newspaper news service, a weather forecasting service, a sports service, a local government service, etc. Further, the at least one service may provide the at least one information associated with the at least one event.

Further, at 604, the method 600 may include analyzing, using the processing device, the plurality of first requests.

Further, at 606, the method 600 may include determining, using the processing device, a plurality of first locations corresponding to the plurality of service providers based on the analyzing of the plurality of first requests. Further, the plurality of first locations relates to at least one geographical area. Further, the at least one geographical area may include at least one city, at least one county, at least one state, at least one country, etc.

Further, at 608, the method 600 may include generating, using the processing device, the primary service provider list based on the determining of the plurality of first locations. Further, the primary service provider list may include a list of the plurality of service providers.

Further, at 610, the method 600 may include storing, using a storage device, the primary service provider list.

In further embodiments, the method 600 may include determining, using the processing device, a proximity corresponding to each first location of the plurality of first locations in relation to the at least one location. Further, the identifying of the at least one service provider may be based on the determining of the proximity corresponding to the each first location of the plurality of first locations in relation to the at least one location.

In further embodiments, the identifying of the at least one service provider is from the primary service provider list based on the determining of the at least location.

Figure 7:
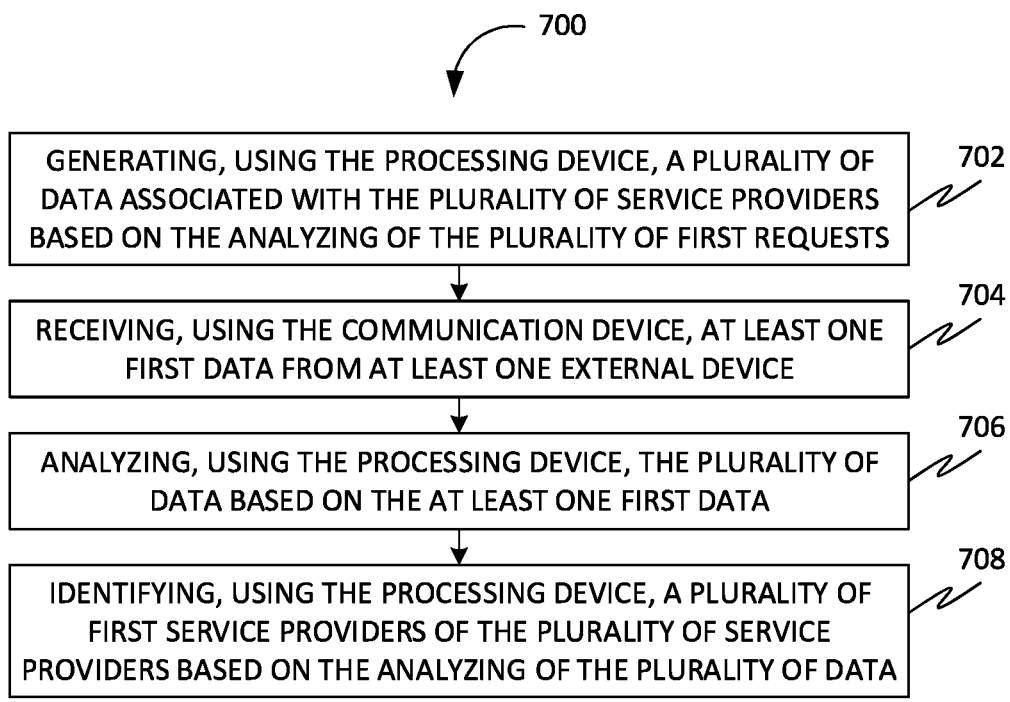
FIG. 7 is a flowchart of a method for ascertaining plurality of first service providers, in accordance with further embodiments.

FIG. 7 is a flowchart of a method 700 for ascertaining plurality of first service providers, in accordance with further embodiments. At 702, the method 700 may include generating, using the processing device, a plurality of data associated with the plurality of service providers based on the analyzing of the plurality of first requests. Further, the plurality of data may include a location of the plurality of service providers. Further, at 704, the method 700 may include receiving, using the communication device, at least one first data from at least one external device (such as the mobile device 106, the electronic devices 110, etc.). Further, the at least one first data may include an information of the plurality of service providers associated with the at least one location. Further, the at least one external device may be associated with at least one external user (such as the user 112).

Further, at 706, the method 700 may include analyzing, using the processing device, the plurality of data based on the at least one first data.

Further, at 708, the method 700 may include identifying, using the processing device, the plurality of first service providers of the plurality of service providers based on the analyzing of the plurality of data. Further, the generating of the primary service provider list may be based on the identifying of the plurality of first service providers of the plurality of service providers.

Figure 8:
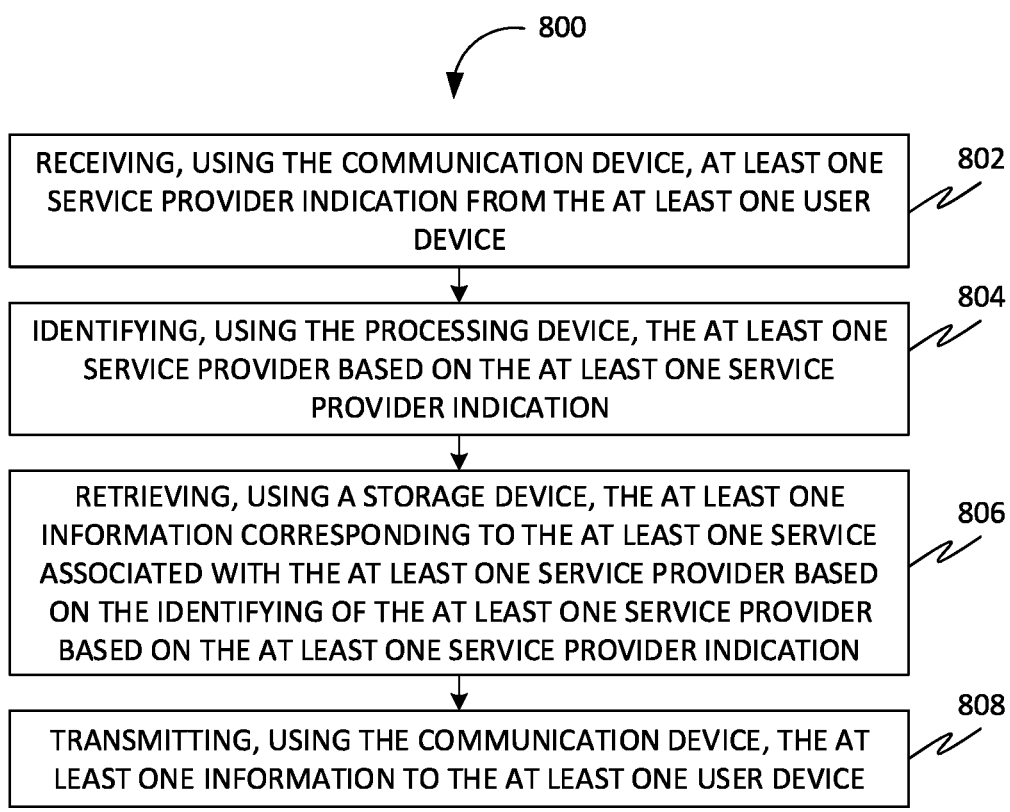
FIG. 8 is a flowchart of a method for sending the at least one information to the at least one user device, in accordance with further embodiments.

FIG. 8 is a flowchart of a method 800 for sending the at least one information to the at least one user device, in accordance with further embodiments. At 802, the method 800 may include receiving, using the communication device, at least one service provider indication from the at least one user device.

Further, at 804, the method 800 may include identifying, using the processing device, the at least one service provider based on the at least one service provider indication.

Further, at 806, the method 800 may include retrieving, using a storage device, the at least one information corresponding to the at least one service associated with the at least one service provider based on the identifying of the at least one service provider based on the at least one service provider indication.

Further, at 808, the method 800 may include transmitting, using the communication device, the at least one information to the at least one user device.

Figure 9:
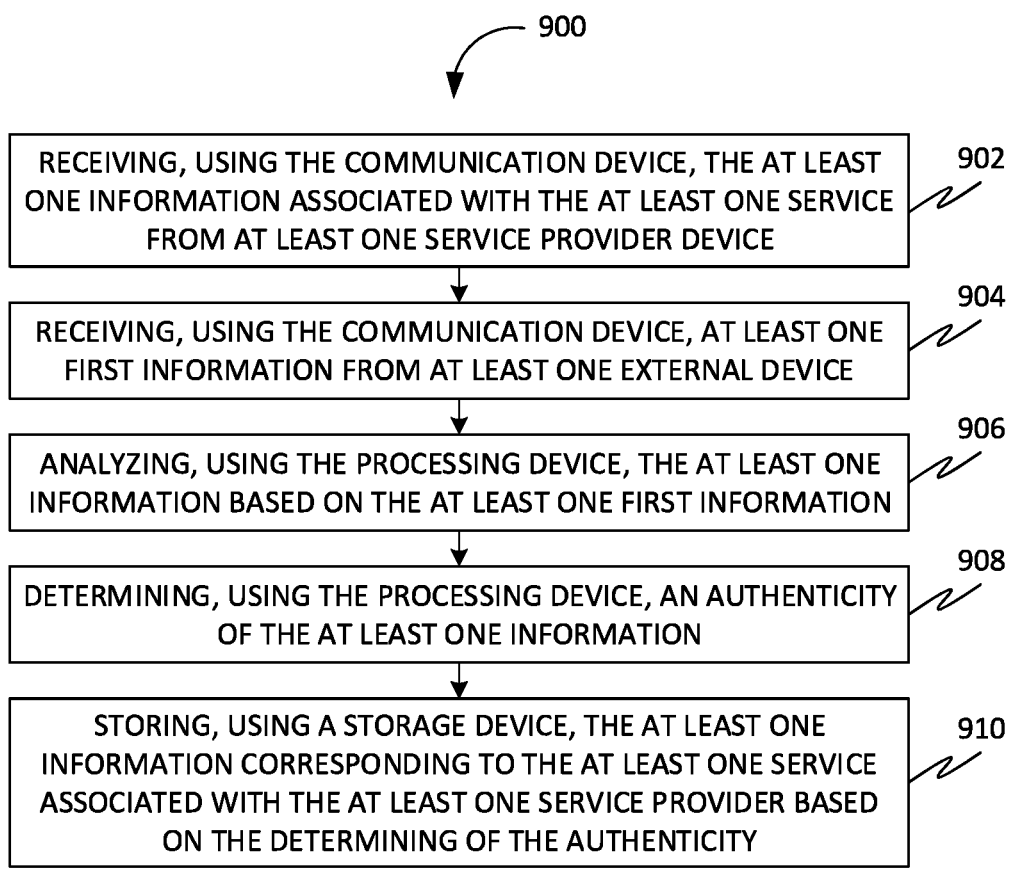
FIG. 9 is a flowchart of a method for saving the at least one information corresponding to the at least one service, in accordance with further embodiments.

FIG. 9 is a flowchart of a method 900 for saving the at least one information corresponding to the at least one service, in accordance with further embodiments. At 902, the method 900 may include receiving, using the communication device, the at least one information associated with the at least one service from at least one service provider device (such as the mobile device 106, the electronic devices 110, etc.).

Further, at 904, the method 900 may include receiving, using the communication device, at least one first information from at least one external device (such as the mobile device 106, the electronic devices 110, etc.). Further, the at least one first information may include an information of the at least one information associated with the at least one location.

Further, at 906, the method 900 may include analyzing, using the processing device, the at least one information based on the at least one first information.

Further, at 908, the method 900 may include determining, using the processing device, an authenticity of the at least one information.

Further, at 910, the method 900 may include storing, using a storage device, the at least one information corresponding to the at least one service associated with the at least one service provider based on the determining of the authenticity.

Figure 10:
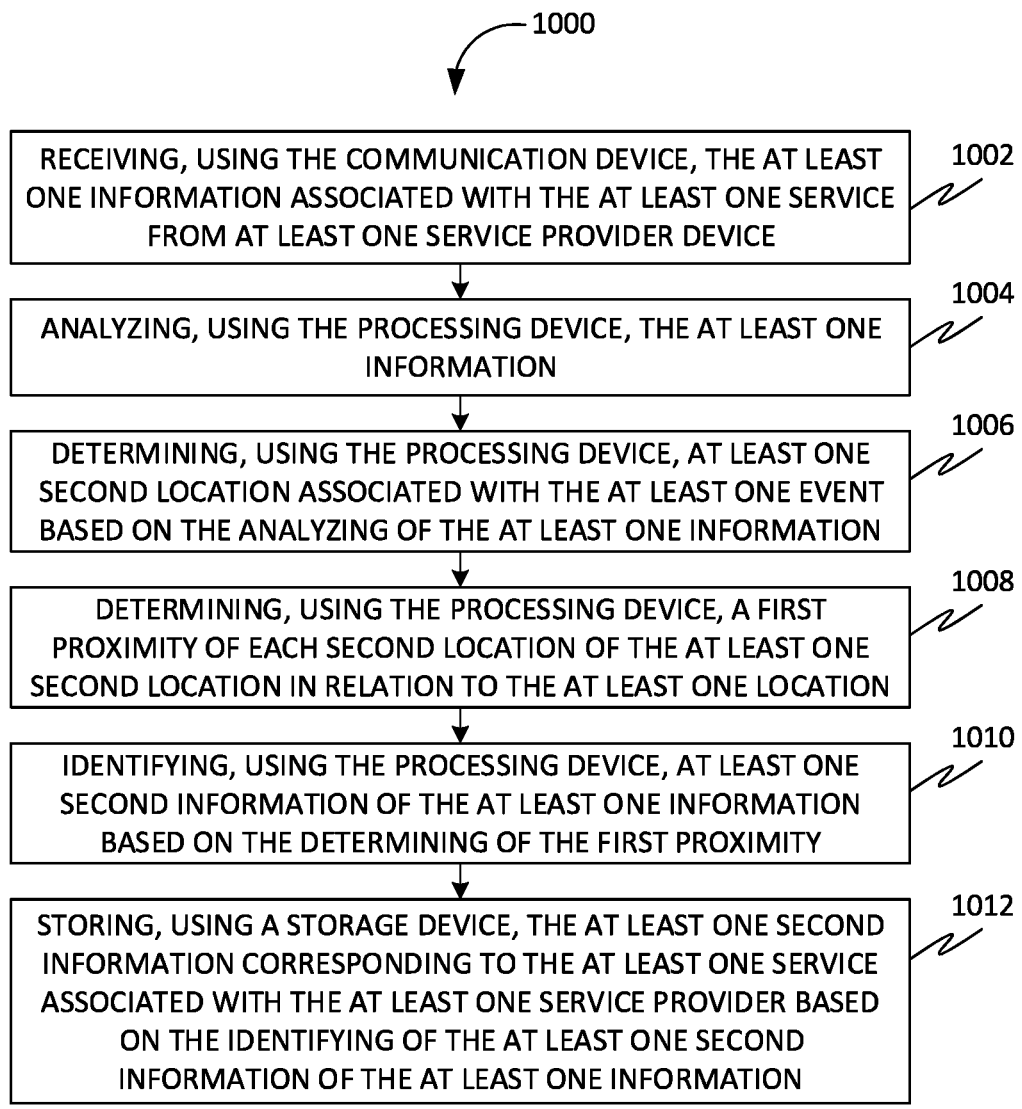
FIG. 10 is a flowchart of a method for saving the at least one second information corresponding to the at least one service, in accordance with further embodiments.

FIG. 10 is a flowchart of a method 1000 for saving the at least one second information corresponding to the at least one service, in accordance with further embodiments. At 1002, the method 1000 may include receiving, using the communication device, the at least one information associated with the at least one service from at least one service provider device (such as the mobile device 106, the electronic devices 110, etc.).

Further, at 1004, the method 1000 may include analyzing, using the processing device, the at least one information.

Further, at 1006, the method 1000 may include determining, using the processing device, at least one second location associated with the at least one event based on the analyzing of the at least one information. Further, the at least one second location may include an information of the at least one event associated with the at least one location.

Further, at 1008, the method 1000 may include determining, using the processing device, a first proximity of each second location of the at least one second location in relation to the at least one location.

Further, at 1010, the method 1000 may include identifying, using the processing device, at least one second information of the at least one information based on the determining of the first proximity.

Further, at 1012, the method 1000 may include storing, using a storage device, the at least one second information corresponding to the at least one service associated with the at least one service provider based on the identifying of the at least one second information of the at least one information.

Figure 11:
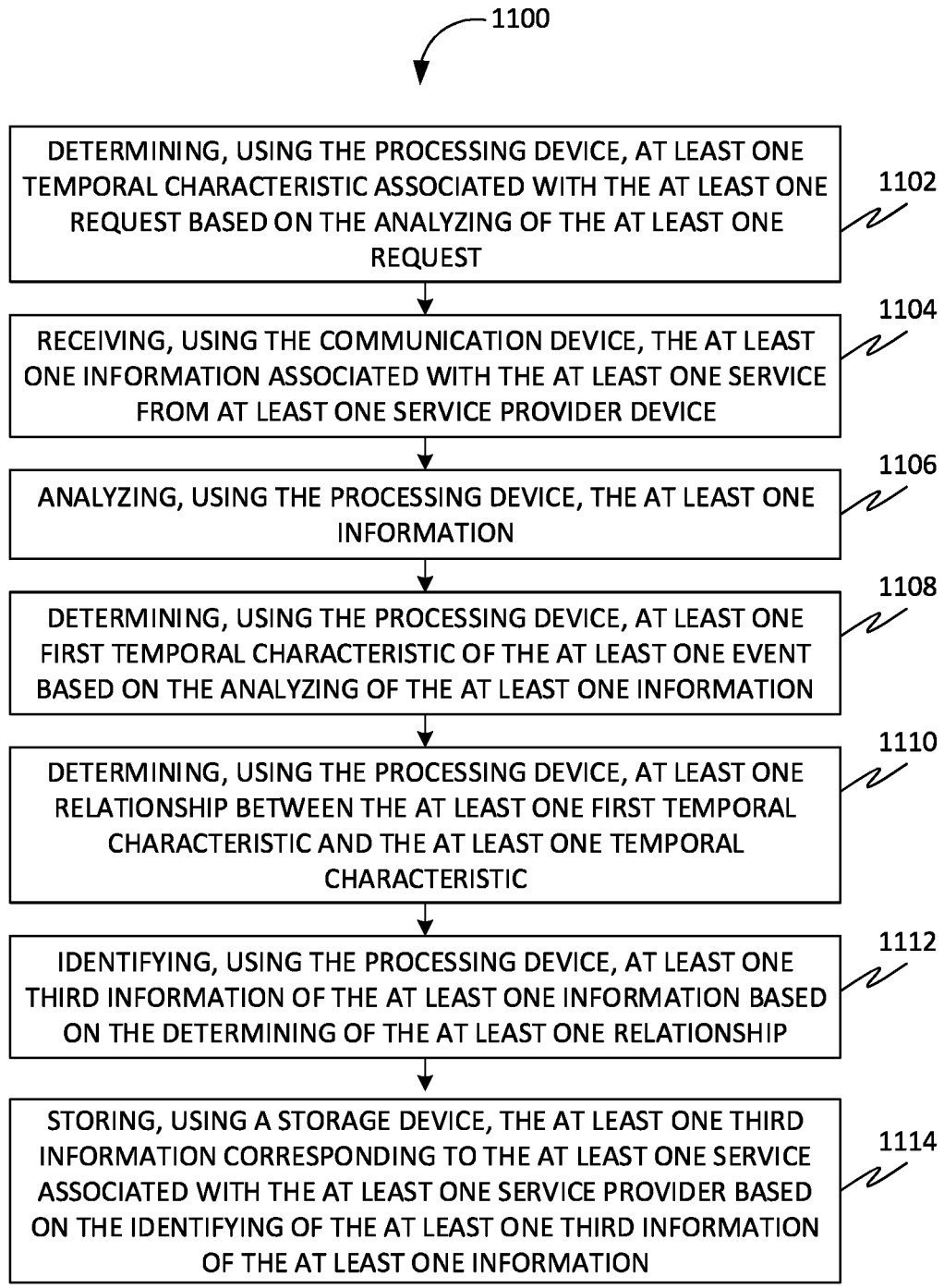
FIG. 11 is a flowchart of a method for saving the at least one third information corresponding to the at least one service, in accordance with further embodiments.

FIG. 11 is a flowchart of a method 1100 for saving the at least one third information corresponding to the at least one service, in accordance with further embodiments. At 1102, the method 1100 may include determining, using the processing device, at least one temporal characteristic associated with the at least one request based on the analyzing of the at least one request. Further, the at least one temporal characteristic may include at least one of a time event and a date event of the at least one request.

Further, at 1104, the method 1100 may include receiving, using the communication device, the at least one information associated with the at least one service from at least one service provider device.

Further, at 1106, the method 1100 may include analyzing, using the processing device, the at least one information.

Further, at 1108, the method 1100 may include determining, using the processing device, at least one first temporal characteristic of the at least one event based on the analyzing of the at least one information. Further, the at least one first temporal characteristic may include at least one of a time event and a date event of the at least one event.

Further, at 1110, the method 1100 may include determining, using the processing device, at least one relationship between the at least one first temporal characteristic and the at least one temporal characteristic. Further, the at least one relationship may include a proximity associated with the at least one temporal characteristic and the at least one first temporal characteristic.

Further, at 1112, the method 1100 may include identifying, using the processing device, at least one third information of the at least one information based on the determining of the at least one relationship.

Further, at 1114, the method 1100 may include storing, using a storage device, the at least one third information corresponding to the at least one service associated with the at least one service provider based on the identifying of the at least one third information of the at least one information.

Figure 12:
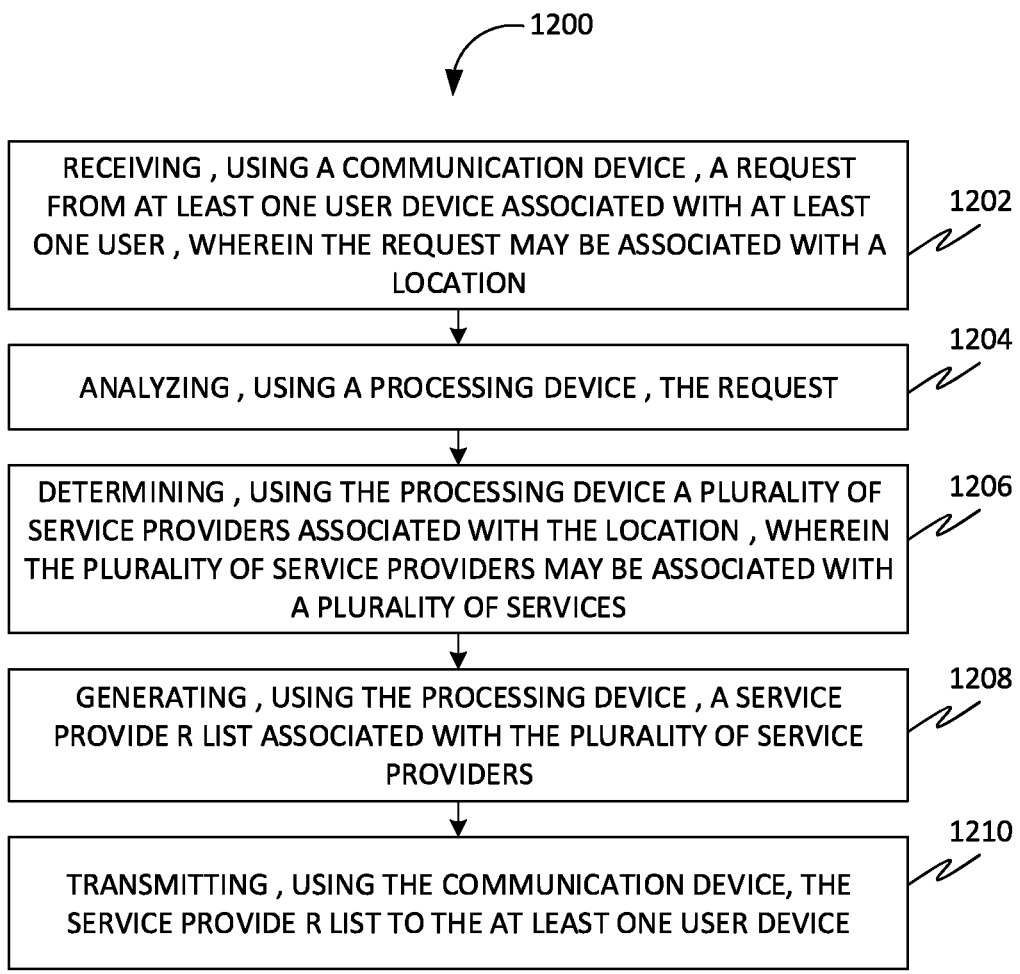
FIG. 12 is a flowchart of a method for redirecting internet traffic to valid businesses of a particular area, in accordance with further embodiments.

FIG. 12 is a flowchart of a method 1200 for redirecting internet traffic to valid businesses of a particular area, in accordance with further embodiments. At 1202, the method 1200 may include a step of receiving, using a communication device, a request from at least one user device associated with at least one user. Further, the request may be associated with a location. Further, the request may include entering a name of the location in a search box provided by a website. Further, the location may include the name of a city/state/county associated with a country. Further, the at least one user device may include a mobile device 106 (such as a smartphone, a laptop, a tablet computer, etc.), other electronic devices 110 (such as desktop computers, server computers, etc.).

Further, at 1204, the method 1200 may include a step of analyzing, using a processing device, the request to obtain at least one of a location of interest and a requested service. Further, the step of analyzing may include analyzing the request made by the at least one user.

Further, at 1206, the method 1200 may include a step of determining, using the processing device, a plurality of service providers associated with the location and the requested service. Further, the plurality of service providers may be associated with a plurality of services. Further, the plurality of services may include a website service (such as a local TV station website, a newspaper website, a local page website, etc.), a TV news service, a newspaper news service, a weather forecasting service, a sports service, a local government service, etc. Further, the plurality of services may provide information related to a life event, a birth event, a death event, a wedding event, a graduation event, etc.

Further, at 1208, the method 1200 may include a step of generating, using the processing device, a service provider list associated with the plurality of service providers. Further, the service provider list may include a list of the plurality of service providers associated with the location.

Further, at 1210, the method 1200 may include a step of transmitting, using the communication device, the service provider list to the at least one user device. Further, the at least one user may choose a service provider from the plurality of service providers.

Figure 13:
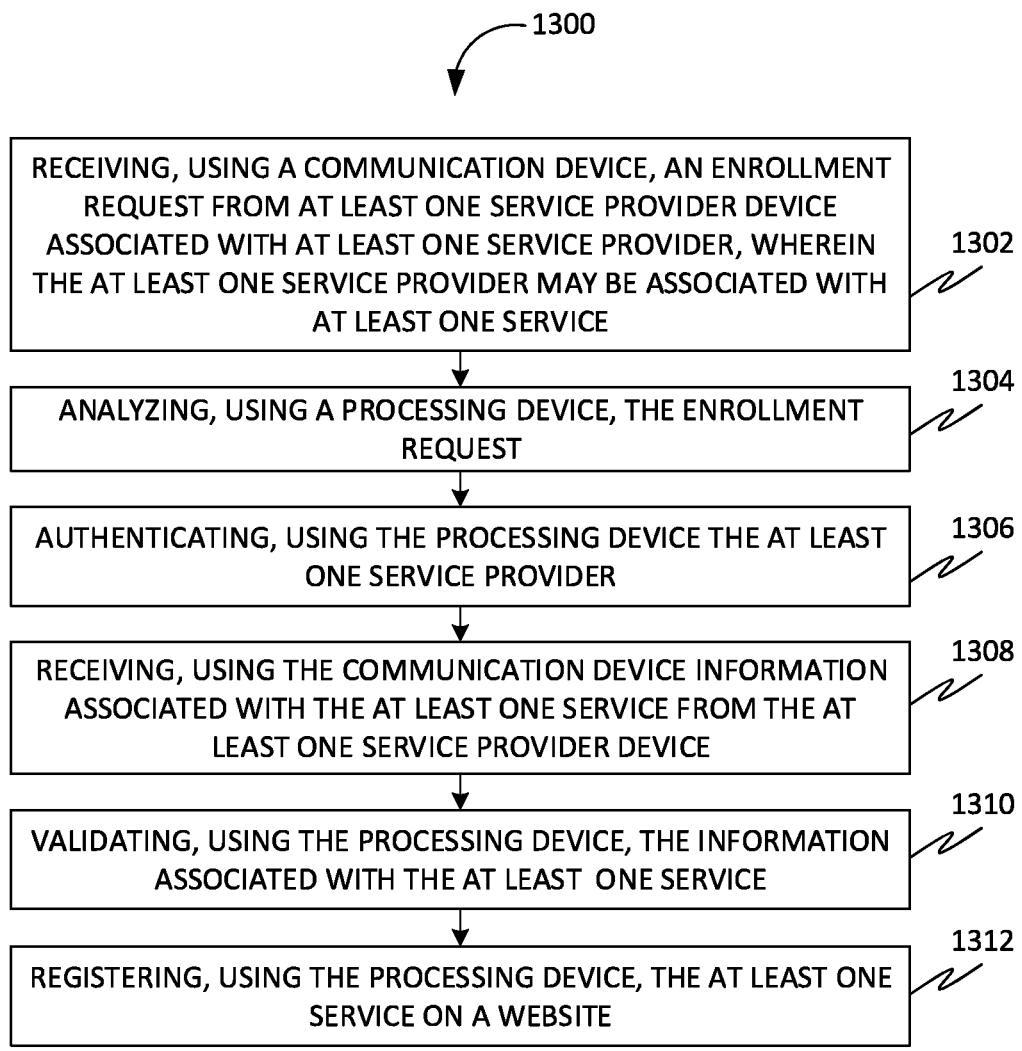
FIG. 13 is a flowchart of a method for facilitating the registration of a service provider on a website, in accordance with further embodiments.

FIG. 13 is a flowchart of a method 1300 for facilitating the registration of a service provider on a website, in accordance with further embodiments. At 1302, the method 1300 may include a step of receiving, using a communication device, an enrollment request from at least one service provider device associated with at least one service provider. Further, the at least one service provider may be associated with at least one service. Further, the enrollment request may include a request for enrolling into the website. Further, the at least one service may include a website service (such as a local TV station website, a newspaper website, a local page website, etc.), a TV news service, a newspaper news service, a weather forecasting service, a sports service, a local government service, etc. Further, the plurality of services may provide information related to a life event, a birth event, a death event, a wedding event, a graduation event, etc. Further, the at least one service provider device may include a mobile device 106 (such as a smartphone, a laptop, a tablet computer, etc.), other electronic devices 110 (such as desktop computers, server computers, etc.).

Further, at 1304, the method 1300 may include a step of analyzing, using a processing device, the enrollment request. Further, the step of analyzing may include analyzing the enrollment request made by the at least one service provider.

Further, at 1306, the method 1300 may include a step of authenticating, using the processing device, the at least one service provider. Further, the step of authenticating may include verifying the identity of the at least one service provider using an authentication method. Further, the authentication method may include one-step authentication, two-step authentication, etc.

Further, at 1308, the method 1300 may include a step of receiving, using the communication device, information associated with the at least one service from the at least one service provider device. Further, the information may be associated with data.

Further, at 1310, the method 1300 may include a step of validating, using the processing device, the information associated with the at least one service. Further, the step of validating may include evaluation of the data to confirm if the at least one service provider is capable of consistently delivering quality services.

Further, at 1312, the method 1300 may include a step of registering, using the processing device, the at least one service on the website. Further, the at least one service associated the at least one service provider may be registered on the website.

Figure 14:
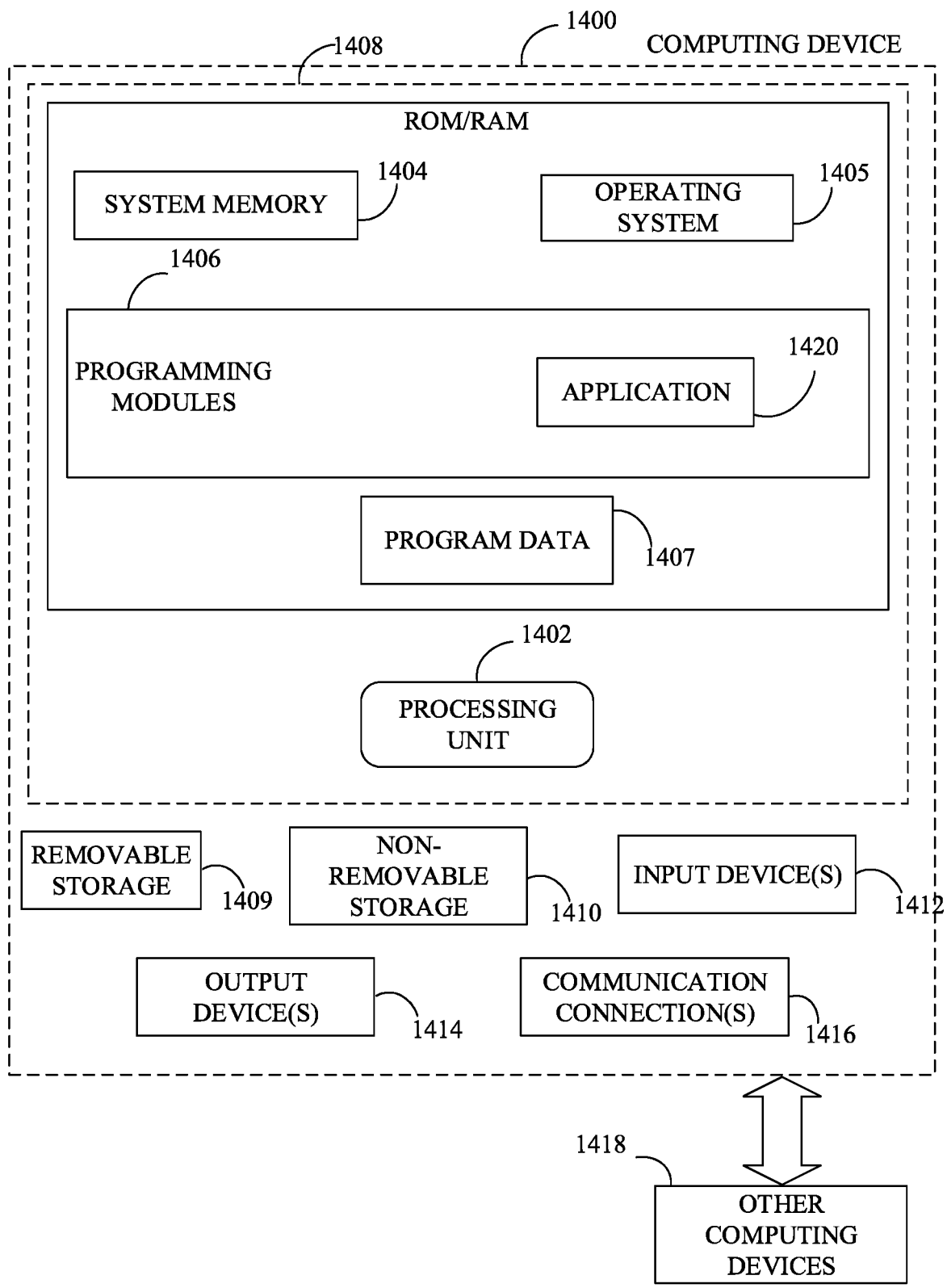
FIG. 14 is a block diagram of a computing device for implementing the methods disclosed herein, in accordance with some embodiments.

With reference to FIG. 14, a system consistent with an embodiment of the disclosure may include a computing device or cloud service, such as computing device 1400. In a basic configuration, computing device 1400 may include at least one processing unit 1402 and a system memory 1404. Depending on the configuration and type of computing device, system memory 1404 may comprise, but is not limited to, volatile (e.g. random-access memory (RAM)), non-volatile (e.g. read-only memory (ROM)), flash memory, or any combination. System memory 1404 may include operating system 1405, one or more programming modules 1406, and may include a program data 1407. Operating system 1405, for example, may be suitable for controlling computing device 1400's operation. In one embodiment, programming modules 1406 may include the image-processing module, machine learning module. Furthermore, embodiments of the disclosure may be practiced in conjunction with a graphics library, other operating systems, or any other application program and is not limited to any particular application or system. This basic configuration is illustrated in FIG. 14 by those components within a dashed line 1408.

Computing device 1400 may have additional features or functionality. For example, the computing device 1400 may also include additional data storage devices (removable and/or non-removable) such as, for example, magnetic disks, optical disks, or tape. Such additional storage is illustrated in FIG. 14 by a removable storage 1409 and a non-removable storage 1410. Computer storage media may include volatile and non-volatile, removable and non-removable media implemented in any method or technology for storage of information, such as computer-readable instructions, data structures, program modules, or other data. System memory 1404, removable storage 1409, and non-removable storage 1410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1400. Any such computer storage media may be part of device 1400. Computing device 1400 may also have input device(s) 1412 such as a keyboard, a mouse, a pen, a sound input device, a touch input device, a location sensor, a camera, a biometric sensor, etc. Output device(s) 1414 such as a display, speakers, a printer, etc. may also be included. The aforementioned devices are examples and others may be used.

Computing device 1400 may also contain a communication connection 1416 that may allow device 1400 to communicate with other computing devices 1418, such as over a network in a distributed computing environment, for example, an intranet or the Internet. Communication connection 1416 is one example of communication media.

Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 1404, including operating system 1405. While executing on processing unit 1402, programming modules 1406 (e.g., application 1420 such as a media player) may perform processes including, for example, one or more stages of methods, algorithms, systems, applications, servers, databases as described above. The aforementioned process is an example, and processing unit 1402 may perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

The following is claimed:

1. A method for facilitating redirecting of internet traffic to service providers of a particular location, the method comprising:

receiving, using a communication device, at least one request from at least one user device associated with at least one user;

analyzing, using a processing device, the at least one request;

determining, using the processing device, at least one location based on the analyzing;

identifying, using the processing device, at least one service provider based on the determining, wherein the at least one service provider is associated with at least one service, wherein the at least one service comprises at least one information associated with at least one event, wherein the at least one event comprises a life event, a birth event, a death event, a wedding event, a ceremonial event, and a graduation event;
generating, using the processing device, a service provider list;
transmitting, using the communication device, the service provider list to the at least one user device;
determining, using the processing device, at least one temporal characteristic associated with the at least one request based on the analyzing of the at least one request;
receiving, using the communication device, the at least one information associated with the at least one service from at least one service provider device;
analyzing, using the processing device, the at least one information;
determining, using the processing device, at least one first temporal characteristic of the at least one event based on the analyzing of the at least one information;
determining, using the processing device, at least one relationship between the at least one first temporal characteristic and the at least one temporal characteristic, wherein the at least one relationship comprises a proximity associated with the at least one temporal characteristic and the at least one first temporal characteristic;
identifying, using the processing device, at least one third information of the at least one information based on the determining of the at least one relationship; and
storing, using a storage device, the at least one third information corresponding to the at least one service associated with the at least one service provider based on the identifying of the at least one third information of the at least one information.

2. The method of claim 1, wherein the at least one user device comprises at least one sensor, wherein the at least one sensor is configured for generating the at least one request based on a location of the at least one user device.

3. The method of claim 1 further comprising:
determining, using the processing device, at least one requested service based on the analyzing of the at least one request; and
selecting, using the processing device, at least one first service provider of the at least one service provider based on the determining of the at least one requested service, wherein the generating of the service provider list is based on the selecting.

4. The method of claim 1 further comprising:
receiving, using the communication device, a plurality of first requests associated with a plurality of service providers from a plurality of service provider devices;
analyzing, using the processing device, the plurality of first requests;
determining, using the processing device, a plurality of first locations corresponding to the plurality of service providers based on the analyzing of the plurality of first requests;
generating, using the processing device, a primary service provider list based on the determining of the plurality of first locations; and
storing, using the storage device, the primary service provider list.

5. The method of claim 4 further comprising:
generating, using the processing device, a plurality of data associated with the plurality of service providers based on the analyzing of the plurality of first requests;
receiving, using the communication device, at least one first data from at least one external device;
analyzing, using the processing device, the plurality of data based on the at least one first data; and
identifying, using the processing device, a plurality of first service providers of the plurality of service providers based on the analyzing of the plurality of data, wherein the generating of the primary service provider list is based on the identifying of the plurality of first service providers of the plurality of service providers.

6. The method of claim 4 further comprising determining, using the processing device, a proximity corresponding to each first location of the plurality of first locations in relation to the at least one location, wherein the identifying of the at least one service provider is based on the determining of the proximity corresponding to the each first location of the plurality of first locations in relation to the at least one location.

7. The method of claim 1 further comprising:
receiving, using the communication device, at least one service provider indication from the at least one user device;
identifying, using the processing device, the at least one service provider based on the at least one service provider indication;
retrieving, using the storage device, the at least one information corresponding to the at least one service associated with the at least one service provider based on the identifying of the at least one service provider based on the at least one service provider indication; and
transmitting, using the communication device, the at least one information to the at least one user device.

8. The method of claim 1 further comprising:
receiving, using the communication device, the at least one information associated with the at least one service from at least one service provider device;
receiving, using the communication device, at least one first information from at least one external device;
analyzing, using the processing device, the at least one information based on the at least one first information;
determining, using the processing device, an authenticity of the at least one information; and
storing, using the storage device, the at least one information corresponding to the at least one service associated with the at least one service provider based on the determining of the authenticity.

9. The method of claim 1 further comprising:
receiving, using the communication device, the at least one information associated with the at least one service from at least one service provider device;
analyzing, using the processing device, the at least one information;
determining, using the processing device, at least one second location associated with the at least one event based on the analyzing of the at least one information;
determining, using the processing device, a first proximity of each second location of the at least one second location in relation to the at least one location;
identifying, using the processing device, at least one second information of the at least one information based on the determining of the first proximity; and
storing, using the storage device, the at least one second information corresponding to the at least one service associated with the at least one service provider based on the identifying of the at least one second information of the at least one information.

10. A system for facilitating redirecting of internet traffic to service providers of a particular location, the system comprising:
a communication device;
a processing device;
a storage device;
the system being configured for:
receiving, using the communication device, at least one request from at least one user device associated with at least one user;
analyzing, using the processing device, the at least one request;
determining, using the processing device, at least one location based on the analyzing;
identifying, using the processing device, at least one service provider based on the determining, wherein the at least one service provider is associated with at least one service, wherein the at least one service comprises at least one information associated with at least one event, wherein the at least one event comprises a life event, a birth event, a death event, a wedding event, a ceremonial event, and a graduation event;
generating, using the processing device, a service provider list;
transmitting, using the communication device, the service provider list to the at least one user device;
determining, using the processing device, at least one temporal characteristic associated with the at least one request based on the analyzing of the at least one request;
receiving, using the communication device, the at least one information associated with the at least one service from at least one service provider device;
analyzing, using the processing device, the at least one information;
determining, using the processing device, at least one first temporal characteristic of the at least one event based on the analyzing of the at least one information;
determining, using the processing device, at least one relationship between the at least one first temporal characteristic and the at least one temporal characteristic, wherein the at least one relationship comprises a proximity associated with the at least one temporal characteristic and the at least one first temporal characteristic;
identifying, using the processing device, at least one third information of the at least one information based on the determining of the at least one relationship; and
storing, using the storage device, the at least one third information corresponding to the at least one service associated with the at least one service provider based on the identifying of the at least one third information of the at least one information.

11. The system of claim 10, wherein the at least one user device comprises at least one sensor, wherein the at least one sensor is configured for generating the at least one request based on a location of the at least one user device.

12. The system of claim 10, wherein the processing device is further configured for:
determining at least one requested service based on the analyzing of the at least one request; and
selecting at least one first service provider of the at least one service provider based on the determining of the at least one requested service, wherein the generating of the service provider list is based on the selecting.

13. The system of claim 10, wherein the communication device is further configured for
receiving a plurality of first requests associated with a plurality of service providers from a plurality of service provider devices, wherein the processing device is further configured for:
analyzing the plurality of first requests;
determining a plurality of first locations corresponding to the plurality of service providers based on the analyzing of the plurality of first requests; and
generating a primary service provider list, wherein the system further comprises the storage device configured for storing the primary service provider list.

14. The system of claim 13, wherein the processing device is further configured for:
generating a plurality of data associated with the plurality of service providers based on the analyzing of the plurality of first requests;
analyzing the plurality of data based on at least one first data; and
identifying a plurality of first service providers of the plurality of service providers based on the analyzing of the plurality of data, wherein the generating of the primary service provider list is based on the identifying of the plurality of first service providers of the plurality of service providers, wherein the communication device is further configured for receiving the at least one first data from at least one external device.

15. The system of claim 13, wherein the processing device is further configured for determining a proximity corresponding to each first location of the plurality of first locations in relation to the at least one location, wherein the identifying of the at least one service provider is based on the determining of the proximity corresponding to the each first location of the plurality of first locations in relation to the at least one location.

16. The system of claim 10, wherein the communication device is further configured for:
receiving at least one service provider indication from the at least one user device; and
transmitting the at least one information to the at least one user device, wherein the processing device is further configured for identifying the at least one service provider based on the at least one service provider indication, wherein the system further comprises the storage device configured for retrieving the at least one information corresponding to the at least one service associated with the at least one service provider based on the identifying of the at least one service provider based on the at least one service provider indication.

17. The system of claim 10, wherein the communication device is further configured for:
receiving the at least one information associated with the at least one service from at least one service provider device; and
receiving at least one first information from at least one external device, wherein the processing device is further configured for:
analyzing the at least one information based on the at least one first information; and
determining an authenticity of the at least one information, wherein the system further comprises the storage device configured for storing the at least one information corresponding to the at least one service associated with the at least one service provider based on the determining of the authenticity.

18. The system of claim 10, wherein the communication device is further configured for receiving the at least one information associated with the at least one service from at least one service provider device, wherein the processing device is further configured for:

analyzing the at least one information;

determining at least one second location associated with the at least one event based on the analyzing of the at least one information;

determining a first proximity of each second location of the at least one second location in relation to the at least one location; and identifying the at least one second information of the at least one information based on the determining of the first proximity, wherein the system further comprises the storage device configured for storing the at least one second information corresponding to the at least one service associated with the at least one service provider based on the identifying of the at least one second information of the at least one information.

* * * * *